Figure 1:
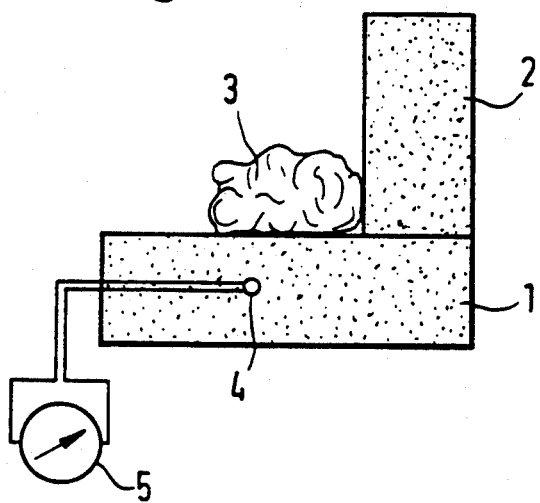

United States Patent [19]

Heitmann et al.

[11] Patent Number: 5,192,811
[45] Date of Patent: Mar. 9, 1993

[54] PROCESS FOR PREPARING A FLAME-RESISTANT, ELASTIC SOFT POLYURETHANE FOAM

[75] Inventors: Ulrich Heitmann, Memmingen; Heribert Rossel, Buxheim, both of Fed. Rep. of Germany

[73] Assignee: Metzeler Schaum GmbH, Memmingen, Fed. Rep. of Germany

[21] Appl. No.: 676,198

[22] Filed: Mar. 27, 1991

[30] Foreign Application Priority Data

Apr. 3, 1990 [DE] Fed. Rep. of Germany ....... 4010752

[51] Int. Cl.$^5$ .................... C08K 21/00; C08G 18/14
[52] U.S. Cl. .................................... 521/99; 521/128; 521/155; 521/170; 521/906
[58] Field of Search ................ 521/99, 128, 155, 170, 521/906

[56] References Cited

U.S. PATENT DOCUMENTS

| | | | |
|---|---|---|---|
| 4,529,742 | 7/1985 | von Bonin | 521/108 |
| 4,729,853 | 3/1988 | von Bonin | 521/907 |
| 4,977,194 | 12/1990 | Haas et al. | 521/99 |
| 5,023,280 | 6/1991 | Haas et al. | 521/106 |

Primary Examiner—Morton Foelak
Attorney, Agent, or Firm—Herbert L. Lerner; Laurence A. Greenberg

[57] ABSTRACT

A process for preparing a flame-resistant, elastic soft polyurethane foam includes admixing a portion of expanded graphite having a particle size of from 0.2 to 1 mm as a flame retardant and a portion of melamine, with a foam reaction mixture of polyol and polyisocyanate.

6 Claims, 1 Drawing Sheet

PROCESS FOR PREPARING A FLAME-RESISTANT, ELASTIC SOFT POLYURETHANE FOAM

The invention relates to a process for preparing a flame-resistant, elastic, soft polyurethane foam from a foam reaction mixture having a polyol and polyisocyanate, as well as a proportion of expanded graphite as a flame-retardant.

As a rule, flexible polyurethane foams are easily combustible, especially since the organic material has a very specific surface area. A number of processes are therefore known in which flammability is to be reduced by means of additives to the foam reaction mixture and by post treatment of the finished foam. Such processes relate to a number of compounds, which particularly contain phosphorus and halogen in the molecule.

With increasing safety requirements, a number of regulations have been issued that restrict the authorization to use combustible materials for certain applications or entirely forbid them. A number of test criteria have been developed for the purposes of deciding on authorization. The criteria are either based on a high, relatively brief load, such as the FAR 25853 C test, in which foam is briefly exposed to a flame with a kerosene burner, or they are based on a longer-lasting exposure to a flame of the material, such as the UIC test, in which 100 g of paper are wadded up into a pad and burned on the material to be tested. The effect of the test on the loss of weight, that is the proportion of the material burned, is ascertained, and a smoldering process that may possibly occur is evaluated. The latter process proceeds without a flame, or may occur as an open flame only after a certain period of time, by self-igniting. Such a procedure is dangerous, particularly with flexible polyurethane foams, because the pyrolysis of the foam proceeds exothermically at higher temperatures.

Flame protection means are described in great number in the literature. British Patent No. 2,168,706, which describes the use of expanded graphite, or Published British application No. 2,177,405, in which melamine is named as a flame protectant, can be emphasized particularly. Those materials can be used successfully to meet certain regulations, but they fail if the test prescribes a long-lasting, highly charged action of heat or flame on the material to be tested, and if subsequent smoldering or incandescence is to be precluded.

It is accordingly an object of the invention to provide a process for preparing a flame-resistant, elastic soft polyurethane foam, which overcomes the hereinafore-mentioned disadvantages of the heretofore-known methods of this general type and in which burning and smoldering or subsequent incandescence of the foam is prevented or at least substantially reduced. In particular, spontaneous ignition by a smoldering process is to be reliably avoided.

With the foregoing and other objects in view there is provided, in accordance with the invention, a process for preparing a flame-resistant, elastic soft polyurethane foam, which comprises admixing a portion of expanded graphite having a particle size of from 0.2 to 1 mm as a flame retardant and a portion of melamine, with a foam reaction mixture of polyol and polyisocyanate.

The synergistic effect of these two materials, expanded graphite and melamine, has unexpectedly produced a foam which is little changed in its physical properties on one hand, but which allows the foam to resist a long-lasting highly charged action of heat and flame and largely precludes subsequent smoldering on the other hand.

Expanded graphite alone expands in response to a major thermal load and as a foam it insulates the material behind it well. However, its disadvantage is that for an already started exothermic decomposition of the foam, it is again only possible to provide a reduced heat dissipation, and this decomposition can therefore build up to the point of spontaneous ignition.

Melamine alone as a flame protectant, along with the polyurethane foam, only presents a slight resistance to an open flame and leads to melting and usually to the production of burning droplets of the material exposed to the flame.

If the melamine is used in the correct ratio, behind the insulating expanded graphite, the melamine takes up so much heat from the exothermic pyrolysis reaction, by consuming heat for its own endothermic melting and conversion process, that the pyrolysis can be brought to a standstill and made to stop.

If expanded graphite alone were used, this stoppage of pyrolysis would only be possible in extremely high concentrations, which would substantially impair its physical properties at low apparent densities of the foam.

In accordance with another mode of the invention, there is provided a process which comprises using the expanded graphite and the melamine at a ratio of from 1:3 to 2:3.

In accordance with a further mode of the invention, there is provided a process which comprises adjusting the joint proportion of expanded graphite and melamine to make up from 20 to 40% by weight of the total reaction mixture.

In order to provide optimal mixing, in accordance with an added mode of the invention, there is provided a process which comprises preparing the foam reaction mixture by initially admixing the expanded graphite and the melamine with only some of the polyol, and the remaining additives, in the form of activators, accelerators and cross-linking agents, are contained in the remaining polyol component.

In accordance with an additional mode of the invention, there is provided a process which comprises adding a further flame protectant to the first polyol component.

In accordance with yet another mode of the invention, there is provided a process which comprises using a filled polyol entirely or partially as the polyol.

In accordance with yet a further mode of the invention, there is provided a process which comprises using a PHD ether as the filled polyol.

When expanded graphite and melamine are used alone, there is also an advantage of freedom from halogens of the combustion gases, and thus reduced toxicity and corrosivity.

In accordance with a concomitant mode of the invention, there is provided a process which comprises setting an apparent density of the filled foam at from 40 to 200 kg/m$^3$.

Other features which are considered as characteristic for the invention are set forth in the appended claims.

Although the invention is illustrated and described herein as embodied in a process for preparing a flame-resistant, elastic soft polyurethane foam, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following examples and description of specific embodiments when read in connection with the accompanying drawings.

The effect of the flame protectant used is shown below by a number of examples and comparison tests. First, in Table 1, typical recipes and different admixtures of expanded graphite and melamine are shown, while the recipes being used are then subsequently described in detail in Table 2:

TABLE 1

| Recipe No. | (in parts by weight) | | | | | |
|---|---|---|---|---|---|---|
| | 1 | 2 | 3 | 4 | 5 | 6 |
| Polyol a | 85 | = | = | = | = | = |
| Polyol b | 15 | = | = | = | = | = |
| Water | 4.02 | = | = | = | = | = |
| Amine activator c | 0.5 | = | = | = | = | = |
| Amine activator d | 0.5 | = | = | = | = | = |
| Stabilizer e | 1.2 | = | = | = | = | = |
| Isocyanate f | 31.6 | = | = | = | = | = |
| Isocyanate g | 13.5 | = | = | = | = | = |
| Expanded graphite h | 20 | 25 | 20 | 10 | 50 | 30 |
| Melamine i | 40 | 35 | 40 | 50 | 10 | — |
| Flame protectant k | — | — | 5 | — | — | 15 |

TABLE 2

| | |
|---|---|
| Polyol a, polyether polyol | e.g., Desmophen 3973 (Bayer) |
| Polyol b, filled polyether polyol | e.g., Desmophen 7619 (Bayer) |
| Amine activator c | e.g., Dabco 33LV (Air Products) |
| Amine activator d | e.g., Niax Al (Union Carbide) |
| Stabilizer e | e.g., B 4690 (Goldschmidt) |
| Isocyanate f | e.g., Desmodur T 65 (Bayer) |
| Isocyanate g | e.g., Desmodur 44V20 (Bayer) |
| Expanded graphite h | e.g., Type MBS (Lineta, Copenhagen) |
| Melamine i | e.g, Standard type (DSM) |
| Flame protectant k | e.g, CR530 (Daihachi Chemical) |

Specifically, in a high-pressure metering machine, the following three components were metered in the quantities given in Table 1, mixed through an expeller mixing head and placed into a heated mold (at approximately 60° C.) having the dimensions of 500×500×100 mm:

1. Polyol a (approximately two-thirds of the total quantity), melamine, expanded graphite and selectively a flame protectant;
2. Polyol a and b (approximately one-third of the total quantity), amine activators, silicone, water;
3. Isocyanate mixture (TDI/MDI in a ratio of 70:30 by weight).

The foam component produced from the above mixture can be removed from the mold after six minutes. Distributing the polyol a into the components 1 and 2 is essentially only necessary in order to enable metering of the viscosities of the two components in a manner suitable for the particular machine.

The foam itself, which is the same in all six recipes, has approximately the following typical physical properties:

| | |
|---|---|
| Apparent density per DIN 53420: | 80 kg/m³ |
| Tensile strength, DIN 53571: | 120 kPa |
| Expansion before rupture, DIN 53571: | 85% |
| Pressure deformation remainder (22 hours, 70° C., 50%), DIN 53572: | 5% |
| Fatigue test, DIN 53574: | |
| Loss in hardness | 12% |
| Loss in height | 2% |

Even with the admixture of different quantities of expanded graphite and melamine, the physical properties in the recipes given only vary a little, since these substances substantially do not participate in the reaction.

The six different foams thus obtained are then subjected to different burning tests, the results of which are summarized in Table 3 below.

TABLE 3

| | Results of burn testing | | | | |
|---|---|---|---|---|---|
| | Test: | | | | |
| Example | Crib 4 | Crib 7 | FAR 25853 b | FAR 25853 c | UIC |
| 1 | P | P | P | P | P |
| 2 | P | P | P | P | P |
| 3 | P | P | P | P | P |
| 4 | P | F | P | F | F |
| 5 | P | F | P | P | F |
| 6 | P | F | P | P | F |

P = passed
F = failed

The Crib 4 and Crib 7 tests are equivalent to British Standard 5852, part 2 in which a wooden crib stacked up on the material to be tested is burned, and the burning behavior of the material located beneath it is evaluated. In accordance with given specifications, this test can then be said to have been "passed" or "failed". The Crib 7 test is equivalent to a more stringent requirement, since the ignition source has a higher mass, by specification.

The FAR tests 25853 b and c are the bunsen burner and kerosene burner tests, respectively, in which the material is exposed to a very hot and intensive flame from a short distance, for a predetermined period of time. After this intensive exposure to flame, the loss in weight of the foam should amount to less than 10%, and the propagation of burning must be limited according to specification.

The UIC test is a test procedure of the Union International de Chemin de Fer, according to which 100 g of paper are wadded into a pad and burned on the material to be tested.

As the results of these burn testing experiments show, the foams that contain expanded graphite and melamine in the ratio according to the invention, passed all of the burning tests.

Figure 2:
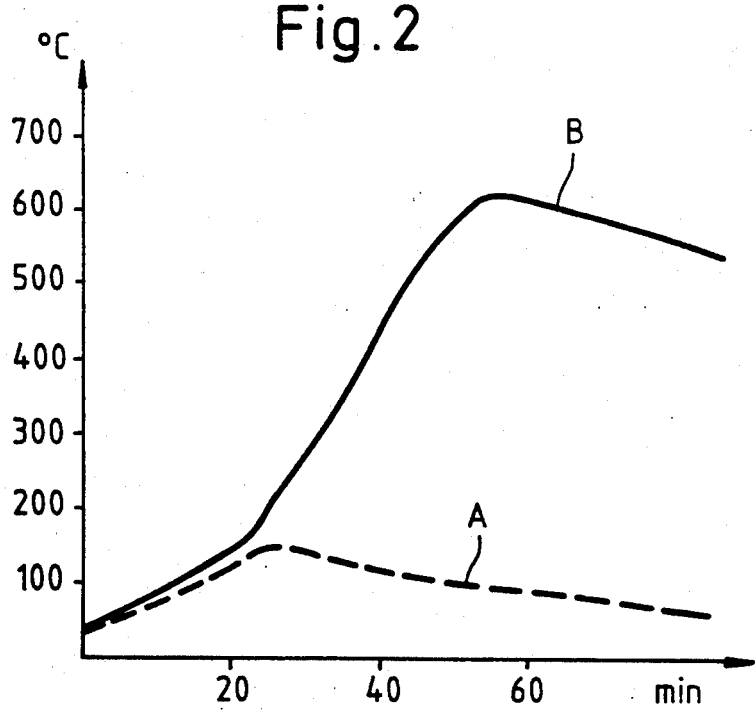

FIG. 1 is a diagrammatic and schematic side-elevational view of a test apparatus used to illustrate the function of the foams prepared according to the invention; and FIG. 2 is a graph of measured values for foams prepared according to the invention.

Referring now to the figures of the drawing in detail and first, particularly, to FIG. 1 thereof, there is seen a test apparatus which is used as prescribed by the UIC test to illustrate the function of the foams prepared according to the invention. In the test, a quantity of 100 g of paper, which is balled into a pad 3, is first placed on two test bodies 1 and 2 of a particular foam that are disposed at right angles to one another, and the paper is then burned up. Before the burning test begins, a thermocouple 4 is thrust into the center of the lower test body 1, and the course of the temperature over a period of 60 minutes is measured with a measuring instrument 5.

The measured values are plotted in the diagram of FIG. 2. A temperature curve A which is shown in broken lines represents the course of the temperature of foam bodies prepared according to the examples 1–3, while a temperature curve B shown in solid lines represents the course of a comparison foam prepared according to example 5 or 6.

As the diagram shows, only a temperature rise from room temperature to approximately 160° to 170° C. was recorded for the foam bodies of examples 1–3, while for the comparison foams of examples 5 and 6, a propagation of the exothermic pyrolytic decomposition could be observed, with a temperature rise up to 650° C., in part accompanied by spontaneous ignition.

The advantage of the process according to the invention and the synergistic action of the addition of expanded graphite and melamine in the ratio according to the invention is thus unequivocally proven.

We claim:

1. A process for preparing a flame-resistant, elastic soft polyurethane foam, which comprises admixing a portion of expanded graphite having a particle size of from 0.2 to 1 mm as a flame retardant and a portion of melamine, with a foam reaction mixture of polyol, polyisocyanate, water, organic blowing agents, activators, accelerators and cross-linking agents, whereby the expanded graphite and the malamine are added in a ratio of from 1:3 to 2:3, adjusting a combined proportion of expanded graphite and melamine to equal from 20 to 40% by weight of the reaction mixture.

2. The process according to claim 1, which comprises preparing the foam reaction mixture by initially admixing one polyol component with the expanded graphite and the melamine, and placing the activators, accelerators and cross-linking agents in another remaining polyol component.

3. The process according to claim 2, which comprises adding a further flame protectant to the one polyol component.

4. The process according to claim 1, which comprises using at least partially filled polyol as the polyol.

5. The process according to claim 4, which comprises using a PHD ether as the filled polyol.

6. The process according to claim 5, which comprises adjusting an apparent density of the filled foam to from 40 to 200 kg/m$^3$.

* * * * *